(12) United States Patent
Blomgren et al.

(10) Patent No.: US 6,567,835 B1
(45) Date of Patent: May 20, 2003

(54) METHOD AND APPARATUS FOR A 5:2 CARRY-SAVE-ADDER (CSA)

(75) Inventors: James S. Blomgren, Austin, TX (US); Jeffrey S. Brooks, Round Rock, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/398,618

(22) Filed: Sep. 17, 1999

Related U.S. Application Data
(60) Provisional application No. 60/149,636, filed on Aug. 17, 1999.

(51) Int. Cl.⁷ .............................. G06F 7/50; G06F 7/00
(52) U.S. Cl. ........................................ 708/708; 708/493
(58) Field of Search ..................... 326/52, 53; 327/248; 708/708, 706–710, 100, 493

(56) References Cited

U.S. PATENT DOCUMENTS

| | | | | |
|---|---|---|---|---|
| 4,644,491 A | * | 2/1987 | Ookawa et al. .............. | 708/493 |
| 4,901,270 A | * | 2/1990 | Galbi et al. ................. | 711/214 |
| 5,787,492 A | * | 7/1998 | Shuma et al. ............... | 708/625 |
| 5,818,747 A | | 10/1998 | Wong | |
| 5,880,985 A | | 3/1999 | Makineni et al. | |
| 5,923,579 A | | 7/1999 | Widigen et al. | |
| 5,935,198 A | | 8/1999 | Blomgren | |
| 5,935,202 A | | 8/1999 | Frederick, Jr. | |
| 5,996,066 A | * | 11/1999 | Yung .......................... | 708/501 |
| 6,066,965 A | | 5/2000 | Blomgren et al. | |
| 6,107,835 A | | 8/2000 | Blomgren et al. | |
| 6,124,735 A | | 9/2000 | Blomgren et al. | |
| 6,216,146 B1 | | 4/2001 | Petro et al. | |
| 6,219,687 B1 | | 4/2001 | Petro et al. | |
| 6,223,199 B1 | | 4/2001 | Petro et al. | |
| 6,275,841 B1 | | 8/2001 | Potter et al. | |

OTHER PUBLICATIONS

Taewhan, et al., Arithmetic Optimization using Carry–Save–Adders, 1998, IEEE Transactions on Computer–Aided Design of Integrated Circuits and Systems, 0–89791, p. 433–438.*

Taewhan et al., Circuit Optimization using Carry–Save–Adder Cells, Oct. 1998, IEEE Transactions on Computer–Aided Design of Integrated Circuits and Systems, vol. 17, p. 974–984.*

U.S. Pat. App. "Method and Apparatus for a 1–of–N Signal" Inventors: Blomgren, et al., Ser. No. 09/01,9278, filed Feb. 5, 1998.

Mehta, et al., High–Speed Multiplier Design Using Multi––Input Counter and Compressor Circuits, IEEE 10th Symposium on Computer Architecture, Jun. 1991; p. 43–50.

* cited by examiner

Primary Examiner—Chuong Dinh Ngo
Assistant Examiner—Chat C. Do
(74) Attorney, Agent, or Firm—Booth & Wright, LLP; Matthew J. Booth; Karen S. Wright

(57) ABSTRACT

The present invention is a 5:2 carry-save-adder (CSA) that receives the five input signals I0, I1, I2, I3 and I4 and computes the two output signals SUM and CARRY. The 5:2 CSA comprises a first level of logic circuitry and a second level of logic circuitry. The first level of logic circuitry comprises a plurality of adders and receives the input signals and generates three intermediate terms T0, T1, and T2. The second level of logic circuitry comprises a carry logic circuit and a sum adder, and uses the intermediate terms to compute the two output signals SUM and CARRY. The 5:2 CSA of the present invention operates using either binary signals or N-NARY signals.

12 Claims, 13 Drawing Sheets

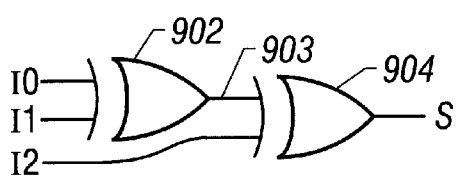
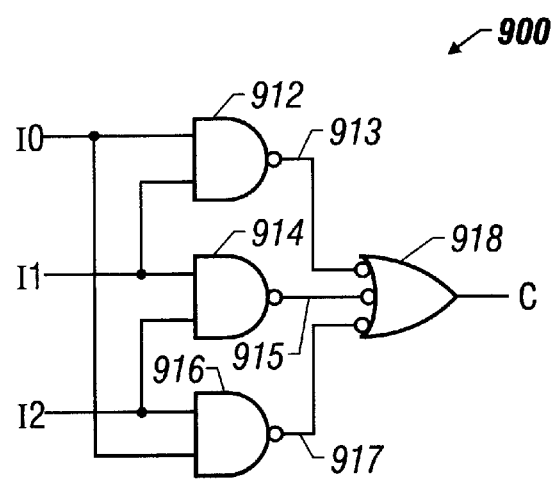
FIG. 9A    FIG. 9B

METHOD AND APPARATUS FOR A 5:2 CARRY-SAVE-ADDER (CSA)

This application claims the benefits of the earlier filed U.S. Provisional App. Ser. No. 60/149,636, filed Aug. 17, 1999, which is incorporated by reference for all purposes into this application.

BACKGROUND OF THE INVENTION

1. Field of the Invention

The present invention relates generally to a carry save adder. More specifically, the present invention relates to a carry save adder for use in a multiplier circuit.

2. Description of the Related Art

The earliest processors did not include hardware to perform multiplication. Instead, multiply operations were accomplished by performing sequences of shifts and adds. As technology evolved to provide higher levels of device integration, it became practical to include hardware dedicated to multiplication within the processor. Initially, the multiply hardware improved the performance of multiplication by directly supporting multiply instructions, although not at the processor's best possible speed (i.e., multiplication typically took much longer to perform than addition). Further evolution of processors has led to fully pipelined multipliers, allowing processors to initiate multiply instructions at the same rate as they initiate addition instructions, although in most cases at a greater latency.

While increasing integration levels allow the implementation of fully pipelined multipliers, the need for multiply performance is being driven by the changing nature of compute intensive programs. Today, these programs are typically dominated by algorithms that model aspects of the physical world. For example, audio and video compression involve transforming information into a different domain, such as audio into the frequency domain, and then the removal of unimportant information from the desired data. This is one example of a multiply intensive operation. Future software will likely require even greater multiply performance, for example, the Newton-Raphson technique in implementing the divide operation is growing in popularity and uses a sequence of multiply operations.

Nearly all processors implement multiply using a combination of two techniques: Booth encoding and Wallace trees. The Booth encoding process, which produces a number of partial products, uses one of the two multiplicands to select multiples of the other operand in each pair of bit positions of the first operand. A Wallace tree then sums the partial products to produce an output. Booth encoding and Wallace trees are well known in the art, and are not discussed in detail in this disclosure.

There exists a variety of Booth encoders and Wallace trees that are known in the art. One of the most common Booth encoders generates one of five different multiples of the second operand: 2x, 1x, 0x, −1x or −2x. It is possible to design other types of Booth encoders, but these other designs could not be implemented by simple multiplexers. (E.g., the 1x and 2x multiples are accomplished by simple shifts, while a 3x multiple requires an addition).

A Wallace tree is typically built from 3:2 counter gates or carry-save-adders (CSA) (also known as carry-save-adders). These gates add three bits of identical significance (or weight), and produce a carry of one bit greater significance, and a sum of identical significance to the inputs. The result is that three bits of the input are reduced to two in one CSA level. It is possible to design other forms of CSAs, such as a 7:3 counter described in Metha et al, *High-Speed Multiplier Design Using Multi-Input Counter and Compressor Circuits*, IEEE 10th Symposium on Computer Architecture (June 1991). These types of counters are typically avoided due to increased complexity, gate count, or an inability to achieve similar performance.

Nearly all of today's CMOS processors are constructed from flip-flop or latch synchronized static logic. New designs are starting to emerge that use combinations of static and dynamic logic, and more aggressive synchronization schemes. For example, Intrinsity, Inc. (formerly known as EVSX, Inc.) has invented a new logic family called N-NARY logic, which can be characterized as a fully-dynamic and self-synchronized logic family. N-NARY logic is more fully described in a copending patent application, U.S. patent application Ser. No. 09/019355, filed Feb. 05, 1998, now U.S. Pat. No. 6,066,965, and titled "Method and Apparatus for a N-NARY logic Circuit Using 1-of-4 Signals", which is incorporated by reference for all purposes into this disclosure and is referred to as "The N-NARY Patent." Additionally, the present invention is related to a multiplier built using N-NARY logic that is fully described in a copending patent application, U.S. patent application Ser. No. 09/186843, filed Nov. 05, 1998, now U.S. Pat. No. 6,275,841 and titled "1-of-4 Multiplier", which is incorporated by reference for all purposes into this disclosure. The present invention incorporates and or modifies N-NARY adders that are described in several copending patent applications, U.S. patent application Ser. No. 09/150720, filed Sep. 10, 1998, now U.S. Pat. No. 6,219,687, and titled "Method and Apparatus for an N-NARY Sum/HPG Gate", U.S. patent application Ser. No. 09/150829, filed Sep. 10, 1998, now U.S. Pat. No. 6,216,146, and titled "Method and Apparatus for an N-NARY Adder Gate", and U.S. patent application Ser. No. 09/150575, filed Sep. 10, 1998, now U.S. Pat. No. 6,223,199, and titled "Method and Apparatus for an N-NARY HPG Gate", all of which are incorporated by reference into this disclosure for all purposes. A greater discussion of capacitance isolation using N-NARY logic can be found in a copending patent application, U.S. patent application Ser. No. 09/209967, filed Dec. 10, 1998, now U.S. Pat. No. 6,124,735, and titled "Method and Apparatus for a N-Nary Logic Circuit Using Capacitance Isolation," which is incorporated by reference for all purposes into this disclosure. Additionally, a greater discussion of the wire capacitance can be found in a copending patent application, U.S. patent application Ser. No. 09/019278, filed Feb. 05, 1998, titled "Method and Apparatus for a 1-of-N Signal," which is incorporated by reference for all purposes into this disclosure. And, the reduced power consumption benefits using N-NARY logic can be found in a copending patent application, U.S. patent application Ser. No. 09/209207, filed Dec. 10, 1998, now U.S. Pat. No. 6,107,835, and titled "Operation-Independent Power Consumption," which is incorporated by reference for all purposes into this disclosure.

The N-NARY logic family supports a variety of 1-of-N signal encodings, including 1-of-4. In 1-of-4 encoding, four wires are used to indicate one of four possible values. In contrast, traditional static logic design uses two wires to indicate four values, as is demonstrated in Table 1. In Table 1, the $A_0$ and $A_1$ wires are used to indicate the four possible values for operand A: 00, 01, 10, and 11. Table 1 also shows the decimal value of an encoded 1-of-4 signal corresponding to the two-bit operand value, and the methodology by which the value is encoded using four wires.

TABLE 1

| 2-bit operand value | | N-NARY (1-of-4) Signal A Decimal Value | N-NARY (1-of-4) Signal A 1-of-4 wires asserted | | | |
|---|---|---|---|---|---|---|
| $A_1$ | $A_0$ | A | A[3] | A[2] | A[1] | A[0] |
| 0 | 0 | 0 | 0 | 0 | 0 | 1 |
| 0 | 1 | 1 | 0 | 0 | 1 | 0 |
| 1 | 0 | 2 | 0 | 1 | 0 | 0 |
| 1 | 1 | 3 | 1 | 0 | 0 | 0 |

"Traditional" dual-rail dynamic logic also uses four wires to represent two bits, but the dual-rail scheme always requires two wires to be asserted. In contrast, as shown in Table 1, N-NARY logic only requires assertion of one wire. The benefits of N-NARY logic over dual-rail dynamic logic, such as reduced power and reduced noise, should be apparent from a reading of the N-NARY Patent. All signals in N-NARY logic, including 1-of-4, are of the 1-of-N form where N is any integer greater than one. A 1-of-4 signal requires four wires to encode four values (0–3 inclusive), or the equivalent of two bits of information. More than one wire will never be asserted for a valid 1-of-N signal. Similarly, N-NARY logic requires that a high voltage be asserted on only one wire for all values, even the value for zero (0). A null value (or no wires asserted) means that no valid data is present.

Any one N-NARY logic gate may comprise multiple inputs and/or outputs. In such a case, a variety of different N-NARY encodings may be employed. For instance, consider a gate that comprises two inputs and two outputs, where the inputs are a 1-of-4 signal and a 1-of-2 signal and the outputs comprise a 1-of-4 signal and a 1-of-3 signal. Variables such as P, Q, R, and S may be used to describe the encoding for these inputs and outputs. One may say that one input comprises 1-of-P encoding and the other comprises 1-of-Q encoding, wherein P equals two and Q equals four. Similarly, the variables R and S may be used to describe the outputs. One might say that one output comprises 1-of-R encoding and the other output comprises 1-of-S encoding, wherein R equals four and S equals 3. Through the use of these, and other, additional variables, it is possible to describe multiple N-NARY signals that comprise a variety of different encodings.

The N-NARY logic family achieves significant advantages when it is able to operate on a "DIT," which is a DUAL-BIT technology and comprise a pairs of bits. Constructing execution units that operate on DITs allows for a significant reduction in power consumption, often by a factor of two, and for a reduction in electrical signal noise levels due to a reduction in the number of wires that are actively switching at any given time, and by the carefully controlled timing of the switching signals. While implementations are possible for virtually all functions required by a typical processor, some functions present problems for N-NARY logic. The two most difficult functions are odd-bit shifts and multiplication. Odd bit shifts are a problem in N-NARY logic because shifting by one bit requires information to be taken from two DITs and combined into one DIT. Multiplication is difficult for N-NARY logic because the nature of all previously designed Wallace trees has required odd-bit shifts at each carry output of each CSA used in the tree. The present invention overcomes the odd-bit shift problem entirely by a novel structure, a 5:2 carry-save-adder.

SUMMARY

The present invention comprises an apparatus and method for a 5:2 carry save adder (CSA). The 5:2 CSA receives the five input signals I0, I1, I2, I3, and I4 and computes the two output signals SUM and CARRY. The 5:2 CSA comprises a first level of logic circuitry and a second level of logic circuitry. The first level of logic circuitry receives the input signals and generates three intermediate terms T0, T1, and T2. The second level of logic circuitry couples to the first level of logic circuitry and uses the intermediate terms to compute the two output signals SUM and CARRY. The 5:2 CSA of the present invention operates using either binary signals or N-NARY signals.

The first level of logic circuitry of the present invention further comprises a plurality of adder gates. A first adder adds the input signals I0 and I1 to generate a first intermediate addend term T0. A second adder adds the input signals I2, I3, and I4 to generate a second intermediate addend term T1. And, a third adder adds the input signals I2, I3, and I4 to generate a third intermediate addend term T2.

The second level of logic circuitry of the present invention further comprises a carry logic circuit and a sum adder circuit. The carry logic circuit receives intermediate terms (T0, T1, and T2) from the plurality of adders in the first level of logic circuitry and computes an output carry signal CARRY. The sum adder receives intermediate terms from the first and third adders (T0 and T2) of the first level of logic circuitry and computes an output sum signal SUM.

BRIEF DESCRIPTION OF THE DRAWINGS

To further aid in understanding the invention, the attached drawings help illustrate specific features of the invention and the following is a brief description of the attached drawings:

FIG. 9 illustrates a 3:2 CSA implemented in static logic.

DETAILED DESCRIPTION OF THE INVENTION

Figure 1:
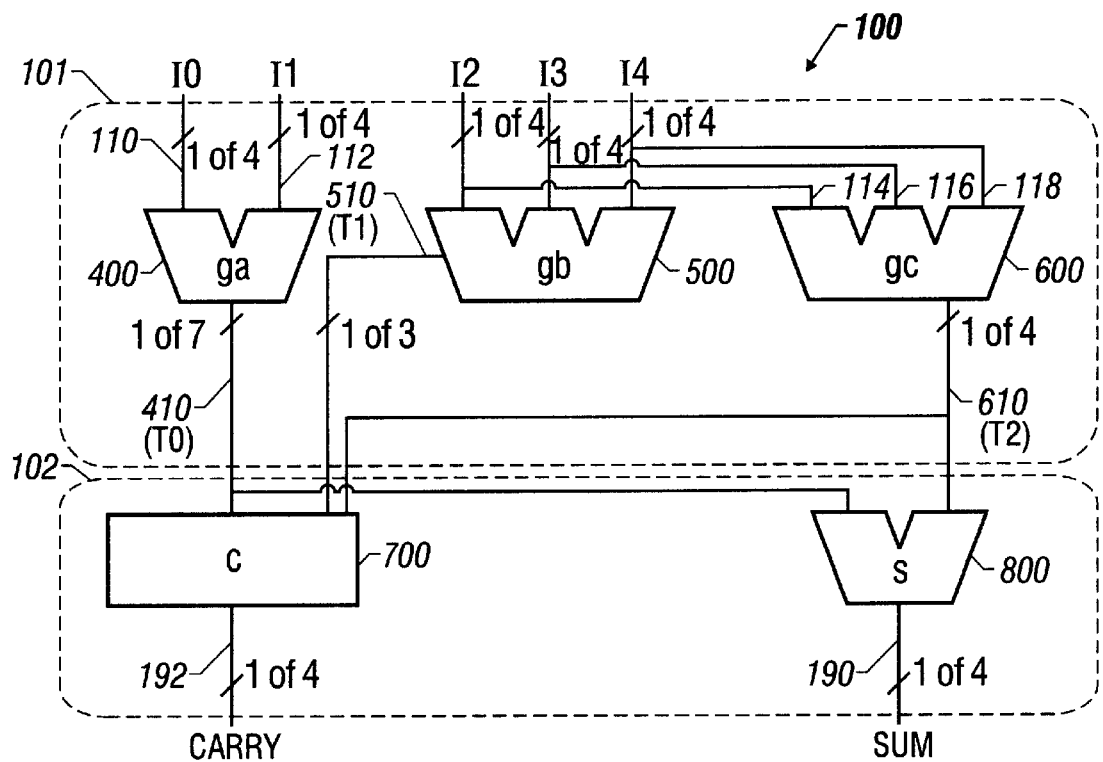
FIG. 1 is a block diagram of a 5:2 Carry-Save-Adder (CSA).

The present invention comprises a method and apparatus for a 5:2 Carry Save Adder (CSA). This disclosure describes numerous specific details that include specific structures, circuits, and logic functions in order to provide a thorough understanding of the present invention. One skilled in the art will appreciate that one may practice the present invention without these specific details.

The N-NARY logic family provides dramatic performance improvements over typical static families, as well as meaningful improvements over other dynamic logic families. Generally, N-NARY logic is characterized by a non-binary nature. An N-NARY signal usually indicates more than one bit of information, and sometimes indicate many different states depending upon the application. One form of an N-NARY signal can indicate four different states, or two bits of information. The challenge met by the present invention is the use of two-bit signals to overcome the odd-bit shift problem as previously described.

Historically, one CSA design has been favored in both binary logic and N-NARY logic—the 3:2 CSA (also known as a carry-save-adder). A 3:2 CSA design can usually be implemented in a reasonable number of static logic gates as illustrated in FIG. 9.

FIG. 9 illustrates a 3:2 carry-save-adder implemented in static logic gates using binary logic. The carry logic circuit tree and the sum logic tree receives the three binary input signals I0, I1, and I2 and computes the two output signals C (carry) and S (sum). The sum logic circuit tree comprises the exclusive-or gates 902 (in the first level of logic) and 904 (in the second level of logic). The exclusive-or gate 902 receives the input signals I0 and I1 and produces an intermediate term 903. The exclusive-or gate 904 receives as an input signal intermediate term 903 and the input signal I2 and produces the sum signal S. Meanwhile, the carry logic circuit tree comprises a first level of logic: NAND gates 912, 914, and 916 and a second level of logic: NOR gate 918. NAND gate 912 receives as input signals I0 and I1 and produces an intermediate term 913. NAND gate 914 receives as input signals I1 and I2 and produces an intermediate term 915. And, NAND gate 916 receives as input signals I2 and I0 and produces an intermediate term 917. The second level of logic, NOR gate 918, receives as input the intermediate terms 913, 915, and 917 and produces the carry signal C.

To understand the function of a 3:2 CSA, consider the following equation:

$$X+Y+Z=S$$

Here, S is equal to the sum of X, Y, and Z. In binary arithmetic, X, Y and Z can each be either one or zero, so the sum S can be any number from zero to three, inclusive. Representing this sum in binary form requires two bits. (These bits are usually called "carry" for the two's bit, and "sum" or "save" for the one's bit—hence the name "carry-save-adder"). This arrangement is particularly optimal because all possible values of the output are used. If, for example, one attempted to construct a 4:2 CSA, one would encounter a problem that can be illustrated by considering the following equation:

$$W+X+Y+Z=S$$

In this case, S can be any number from zero to four, but four can not be represented in two bits, so the result is a design that takes four bits of input, but delivers three bits of output. In other words, a 4:3 CSA gate has been constructed, not a 4:2 CSA.

Since the Wallace tree in a multiplier has the task of reducing many bits of partial products to just two terms for delivery to an adder (within the multiplier), the efficiency of each CSA is of paramount importance. A 4:3 CSA is actually less efficient than a 3:2 CSA because it eliminates or compresses only one bit of every four bits of partial product instead of one of every three bits of a partial product. Another way to view this is that the three output bits of the 4:3 compressor are not fully utilized, i.e., the output bits can indicate the values zero to four, but they can also represent the values five, six and seven, yet these values are never used in binary logic. This is an important observation because this represents a certain inefficiency in a 4:3 CSA. The present invention is faced with the task of finding a similarly efficient arrangement as the 3:2 CSA, but one that can operate on DITs instead of bits, and in quaternary arithmetic instead of binary arithmetic. If a similar efficiency can be found, then the design of the present invention will be at least as optimal as the 3:2 CSA.

Another CSA, as previously discussed, that has seen limited use is the 7:3 CSA. In this case, the equation supported is:

$$T+U+V+W+X+Y+Z=S$$

Since seven bits are added, the maximum possible result is seven, which exactly fills the space a three-bit output can represent. In effect, a 7:3 CSA is simply a 4:3 CSA enhanced to examine additional input bits so as to fill the output space. This type of CSA will output a sum bit and two carry bits. One of the carry bits is of one bit greater significance than the sum bit, and the other carry bit is of two bits greater significance than the sum bit.

For DITs (the DUAL-BIT technology of N-NARY logic), the question is: does a similar arrangement exist. If we examine the above three equations:

$$X+Y+Z=S$$

$$W+x+Y+Z=S$$

$$T+U+V+W+X+Y+Z=S$$

and apply DIT arithmetic (quaternary math), we find that none of the above equations produce optimal results. In the 3:2 CSA, where each input is a DIT that can represent any number between zero and three inclusive, the output can be any number between zero and nine. If we wish to deliver DIT results, then we need to limit our results to either one DIT or two DITs of result. One DIT supports values between zero and three inclusive, and two DITs support values between zero and fifteen inclusive. The second equation is better than the first, because it requires the output to represent numbers between zero and twelve inclusive, but is still not optimal. The third equation can result in an output of 21, which is well beyond what a two DIT output can represent.

If we focus our attention on the number of bits represented by 2 DITs (or 4 bits), then the following equation will lead to an optimal solution:

$$V+W+X+Y+Z=S$$

In the above equation, the maximum sum is fifteen, which is precisely what a two-DIT OUTPUT CSA module can represent. If such a module can be built in N-NARY logic, the resulting design will be at least as efficient as a 3:2 CSA for binary logic.

Rate of Compression

The N-NARY logic family has significant advantages that allow it to perform operations much more quickly than static logic; thus, this discussion should not be used to compare N-NARY logic to static logic. Instead, the focus will be on comparing three types of N-NARY CSAs with each other understand the relative merits of each CSA as used in a multiplier. (Since it is not possible to build quaternary logic from static logic gates, it is not possible to perform a similar comparison in the static logic family. N-NARY logic, on the other hand, can operate as easily on binary quantities as it can on quaternary quantities).

Figure 2:
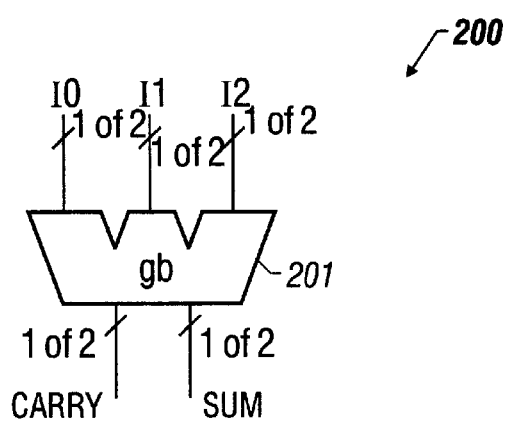
FIG. 2 illustrates a 3:2 N-NARY CSA.
Figure 3:
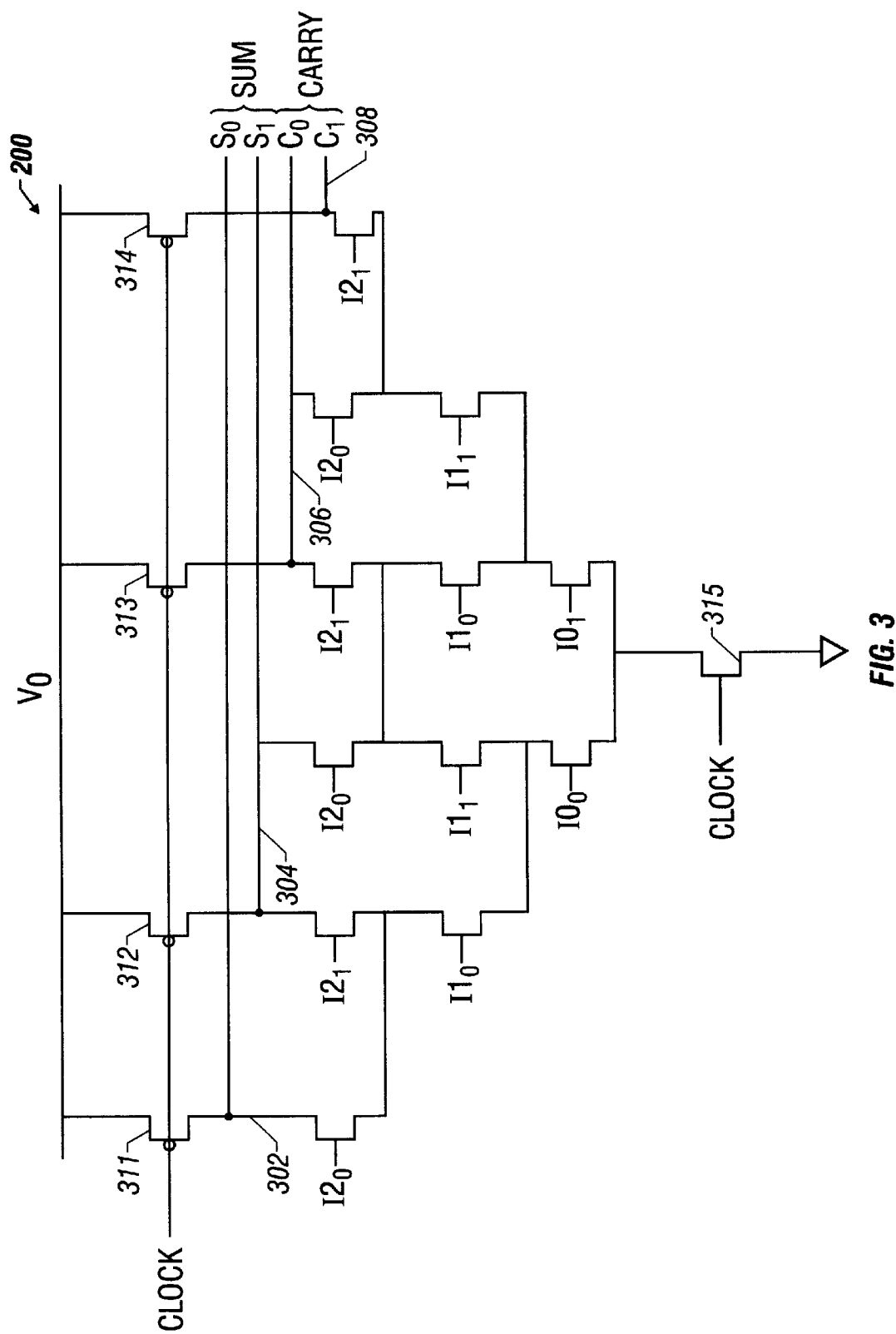
FIG. 3 illustrates the circuit layout of the 3:2 CSA N-NARY gate.

FIG. 2 illustrates a 3:2 N-NARY CSA gate 200 that is built from a single multiple output N-NARY logic gate 201. The 3:2 CSA 200 receives three 1-of-2 inputs I0, I1, and I2 (where each 1-of-2 input can represent binary numbers) and computes a 1-of-2 output sum SUM and 1-of-2 carry output CARRY. FIG. 3 illustrates a circuit layout of the 3:2 CSA N-NARY gate 200. As fully described in the N-NARY Patent, N-NARY logic comprises a plurality of precharge devices 311, 312, 313, and 314 coupled to a clock signal CLOCK, and further comprises a single evaluate device 315 coupled to CLOCK. Internal evaluate node 302 couples to the $S_O$ wire of SUM and internal evaluate node 304 couples to the $S_1$ wire of SUM. Additionally, internal evaluate node 306 couples to the $C_O$ wire of CARRY, and internal evaluate node 308 couples to the $C_1$ wire of CARRY. As illustrated in the N-NARY Patent, one of the capabilities of N-NARY logic is to construct multiple output functions from a single N-stack. The 3:2 CSA 200 gate is very efficient, has excellent capacitance isolation, and has an N-stack height of 3, which means it will be relatively fast.

A 7:3 CSA N-NARY gate, although not depicted here, can be constructed from four of the above 3:2 CSA N-NARY gates or it could be constructed as one gate that would directly handle all of the input and output signals. In fact, the maximum number of input signals an N-NARY gate can examine at one time is a function of its stack height. In order to examine seven input signals, we would require a stack height of seven transistors (unfortunately, a stack height this high is into the operating conditions of diminishing returns for gate speed). Unfortunately, a single-gate 7:3 CSA would be slower than a two-gate-level implementation constructed from t he four 3:2 CSA N-NARY gates. With either circuit layout, however, a 7:3 CSA N-NARY gate requires two gate delays.

FIG. 1 illustrates a 5:2 N-NARY CSA device 100 of the present invention. As illustrated, the 5:2 CSA device 100 requires two levels of N-NARY gates, or a total of five different gates, and operates on 1-of-4 N-NARY (or quaternary) signals. The 5:2 CSA is described below in more detail.

The compression ratio of each the above N-NARY CSA's can be determined as follows:

TABLE 2

| CSA | Logic levels | Average compression ratio |
|---|---|---|
| 3:2 | 1 | 1.500 |
| 7:3 | 2 | 1.533 |
| 5:2 | 2 | 1.583 |

The compression ratio is simply an average of the number of input bits that are consumed per output bit per level of logic. For example, in a 5:2 CSA, 2 bits are consumed in the first logic level, and an additional bit is consumed in the second logic level. The average compression ratio is therefore (5/3+3/2)/2=1.533. The bigger the compression ratio, the faster the CSA is able to reduce the partial products of a Wallace tree for example. As shown in Table 2, the 7:3 CSA compression ratio is better than the 3:2 CSA, which is one of the reasons the 7:3 CSA has been favored more recently by some designs. The 5:2 CSA, however, is better still. In fact, it represents an improvement of approximately 5% better compression over the 3:2 CSA ratio, and a compression improvement of approximately 3% over the 7:3 CSA ratio.

From the above discussion, we can conclude that the reduction-per-level of the 5:2 CSA is the best in both binary logic and N-NARY logic. Depending on the number of partial products in the Wallace tree from the Booth encoders, the 5:2 CSA allows for the reduction in levels required for the multiply operation.

Gate Efficiency of the Different Implementations

The 3:2 CSA above eliminates one bit of information while the 7:3 CSA (the version comprising four 3:2 CSA gates) eliminates four bits of information. Therefore, each of these designs eliminates one bit per gate. The 5:2 CSA, on the other hand, eliminates 6 bits of information (or three DITs) per module (two gate levels). This reduction in the number of bits, 1.25 bits per gate, is more efficient. Note that this comparison, however, is somewhat limited due to the differences in complexity of each of the gates in each of the CSA implementations. For example, in a non-N-NARY dynamic design, 3:2 CSAs are constructed from two or more gates, which deliver the carry output and the sum output. FIG. 9 depicts such an implementation in static logic that requires six gates, XOR gates 902 and 904, and NAND gates 912, 914, 916 and 918. Table 3 summarizes the above discussion for gate efficiency as the following:

TABLE 3

| N-NARY device | Bits eliminated per gate |
|---|---|
| 3:2 | 1 |
| 7:3 | 1 |
| 5:2 | 1.25 |

The 5:2 CSA

FIG. 1 is a block diagram of 5:2 Carry-Save-Adder (CSA) 100 of the present invention. The 5:2 CSA receives the five input signals I0, I1, I2, I3, and I4 and computes the two output signals SUM and CARRY. The 5:2 CSA comprises a first level of logic circuitry 101 and a second level of logic circuitry 102. The first level of logic circuitry receives the input signals and generates three intermediate terms T0, T1, and T2. The second level of logic circuitry couples to the first level of logic circuitry and uses the intermediate terms to compute the two output signals SUM and CARRY In the N-NARY version of the present invention, SUM is a DIT and CARRY is a DIT, where the carry DIT is of one greater DIT (two greater bit) significance The first level of logic circuitry 101 comprises the specialized adders, gate ga (400), gate gb (500), and gate gc (600). Gate ga 400 adds the input signals I0 (110) and I1 (112) and generates an intermediate addend term T0, which is a single 1-of-7 signal 410 that indicates the sum. (The sum can be anything from zero to six inclusive, hence a 1-of-7 signal is necessary). Gate gb 500 adds the input signals I2 (114), I3 (116), and I4 (118) and generates an intermediate addend term T1, which is a 1-of-4 signal 510 and is the most significant DIT of the result of this addition. The most significant DIT is equal to the sum of the three inputs, divided by four. Since the maxi mum sum is 3+3+3, or nine, it is possible for the most significant DIT to equal zero, one or two, but it is not possible for it to equal three since that would require a sum of twelve or more. Gate gc (600) also adds the input signals I2 (114), I3 (116), and I4 (118) and generates an intermediate addend term T2, which is a 1-of-4 signal 610. Gate gc, however, discards the carry information, returning only the sum portion of the three DIT addition (610). This is perhaps the most challenging gate in the present invention as it must account for all internal carry combinations. Thus, from the first level of logic circuitry 101, the 5:2 CSA produces a 1-of-7 signal 410, a 1-of-3 signal 510, and a 1-of-4 signal 610

The second level of logic circuitry 102 of the 5:2 CSA comprises a carry logic circuit, gate c 700, and a sum adder circuit, gate s 800. Gate s 800 completes the final sum output SUM 190. The gate examines the 1-of-7 signal 410 and the 1-of-4 signal 610, discarding both the carry within the 1-of-7 signal 410, and any carry generated from the combination of the sum of the 1-of-7 signal and the 1-of4 signal 610. Gate c 700 generates the final output carry signal CARRY. This gate is also challenging because it must add the carry within the 1-of-7 signal 410 to the 1-of-3 signal 510, and also add an additional carry if the lower significance of the 1-of-7 signal 410 when added to the 1-of-4 signal 610 produces a carry.

The worst-case signal propagation delay through the present invention can be determined by examining the number of N-channel devices any given signal must pass through. By carefully arranging the inputs to the gates, it is possible to limit this delay. Gate ga 400 is only a two-high stack (the height of transistors is never greater than two), meaning that it can produce its result more quickly than a gate with a greater stack height. The other two gates, gate gb 500 and gate gc 600, contain three-high stacks, so they will be somewhat slower. As a result of this, we arrange the second level of logic, gate c 700 and gate s 800, so that the slower outputs from the first level of logic (gates ga, gb and gc) are connected to the upper transistors in the second level of logic. In fact, the most difficult gate in the first level, gate gb 500, couples to the top-most devices in gate c 700. Thus, any path through the present invention never requires passage through more than five N-channel devices (which happens to be t he path from input I2 (114) through gate gc 600 and gate c 700).

Detailed Discussion of Each Gate

FIGS. 4, 5A–5C, 6A and 6B, 7A and 7B, and 8A and 8B illustrate the internal arrangement of N-channel devices in the evaluate stacks of the N-NARY gate s of the present invention. A full discussion of how these gates and N-NARY logic operate is included in the N-NARY patent. In brief, an N-NARY gate's N-stack transistors allow for one, and only one, top node to be discharged, representing the final signal output value. The discharged path is the one with at least one path to the evaluate transistor passing only through transistors that are switched on.

Figure 4:
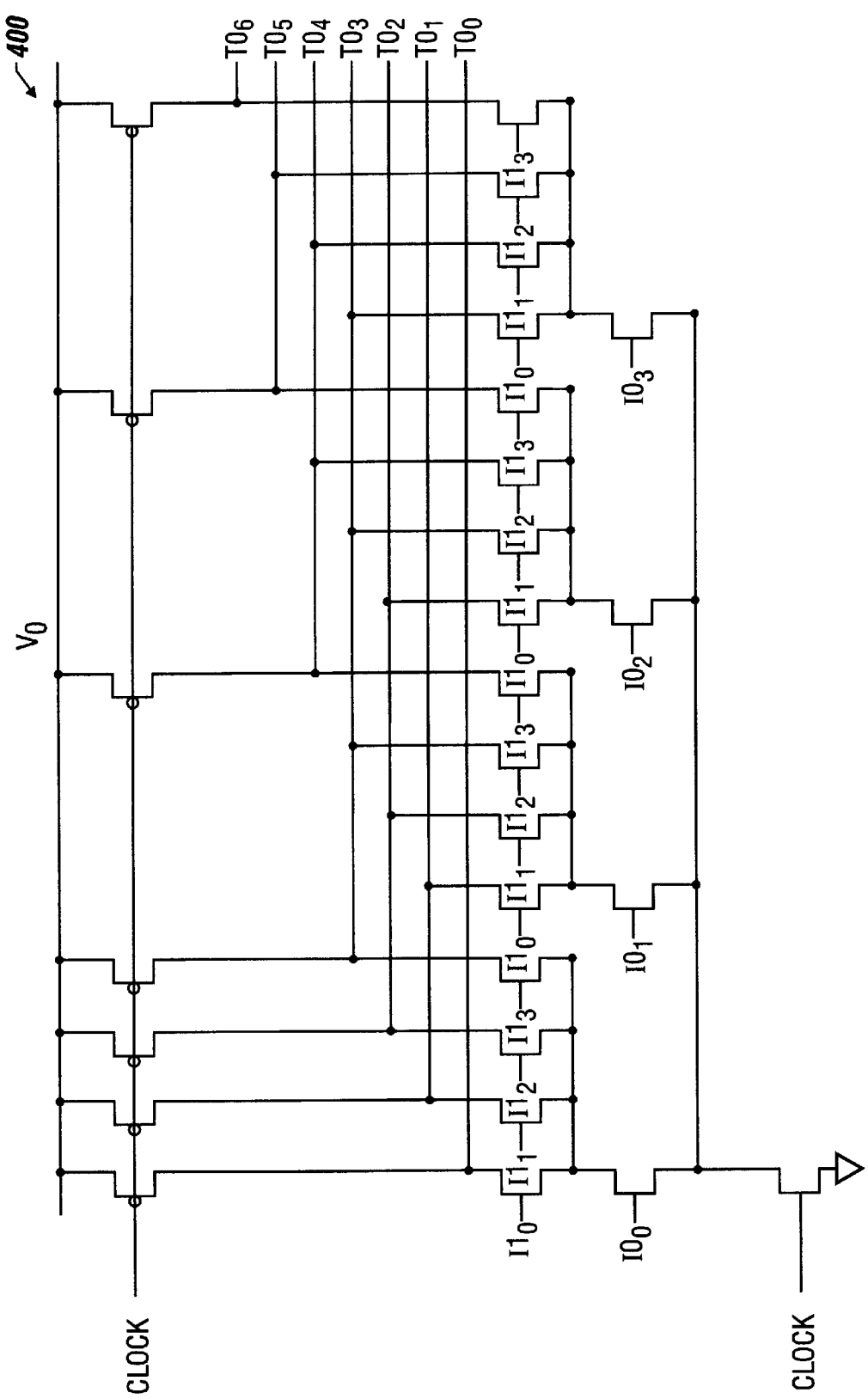
FIG. 4 illustrates the circuit layout of the ga gate in the first level of the 5:2 CSA.

FIG. 4 is a circuit layout of adder gate ga 400 of FIG. 1. The input 1-of-4 signal I0 (110) comprises the four wires $I0_0$, $I0_1$, $I0_2$, and $I0_3$, which couple to the four transistors of gate ga 400 as shown in FIG. 4. The input 1-of-4 signal I1 comprises the four wires $I1_0$, $I1_1$, $I1_2$, and $I1_3$, which couple to the 16 transistors as shown in FIG. 4. In the N-NARY logic style, gate ga 400 comprises 7 internal precharge devices that couple to the clock signal CLOCK, and a single evaluate device that also couples to the clock signal CLOCK. The output of gate ga 400 is the intermediate addend term T0, which can be any value from zero to six inclusive (T0 is the sum of the input signals I0 and I1). T0 is a 1-of-7 signal that comprises the wires $T0_0$, $T0_1$, $T0_2$, $T0_3$, $T0_4$, $T0_5$, and $T0_6$ that couple to the internal evaluate nodes of gate ga 400. The N-stack of gate ga 400 is arranged so that one of the seven internal evaluate nodes will be discharged. Since there is no path where non-discharge-path nodes are gated onto the discharge path, the gate has perfect capacitance isolation. As a result, this is one of the fastest gates in the present invention, operating in as little as 80 ps in a typical 0.18 u CMOS process.

Figure 5A:
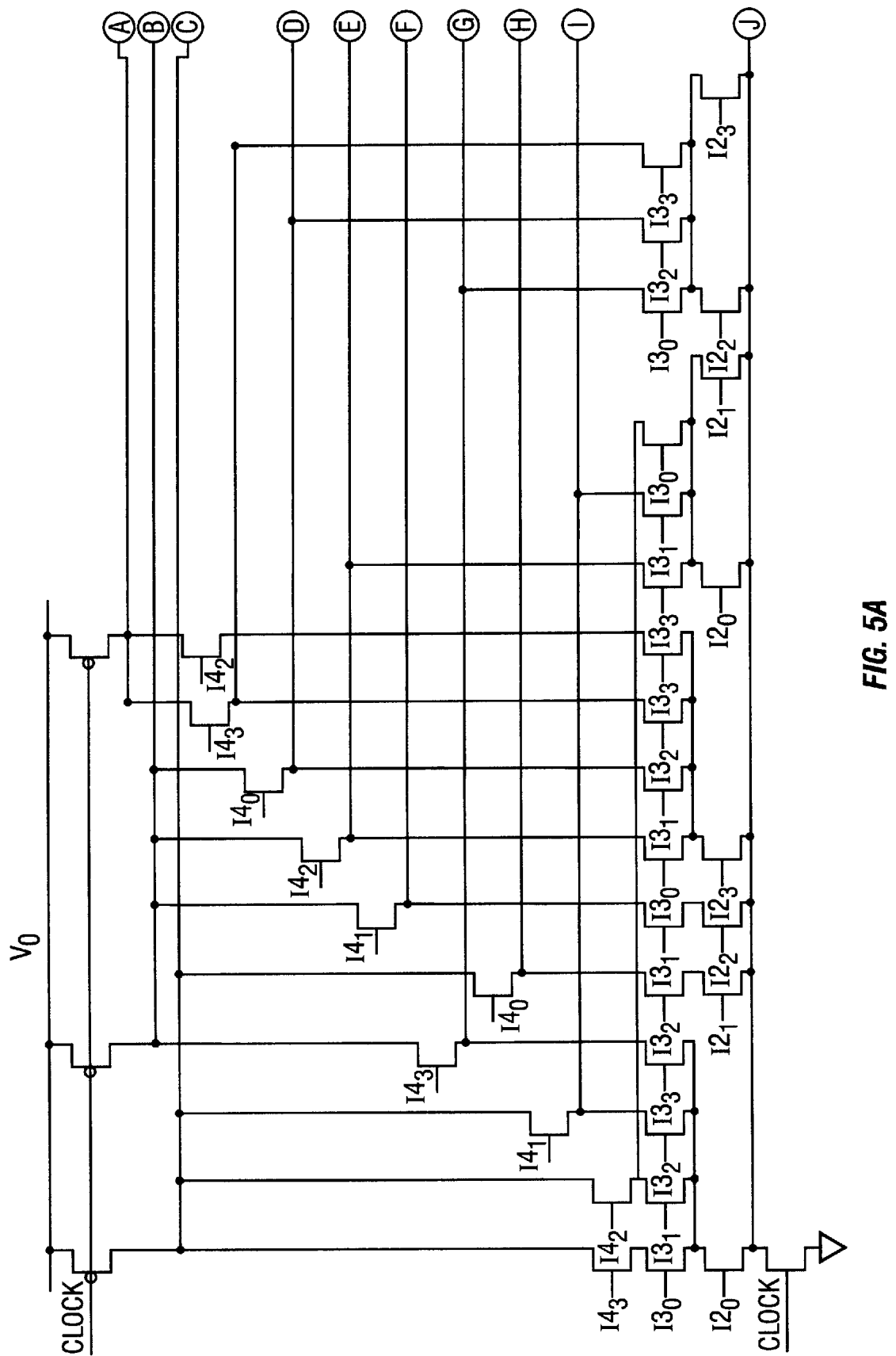
FIGS. 5A–5C illustrate the circuit layout of the gb gate in the first level of the 5:2 CSA.
Figure 5B:
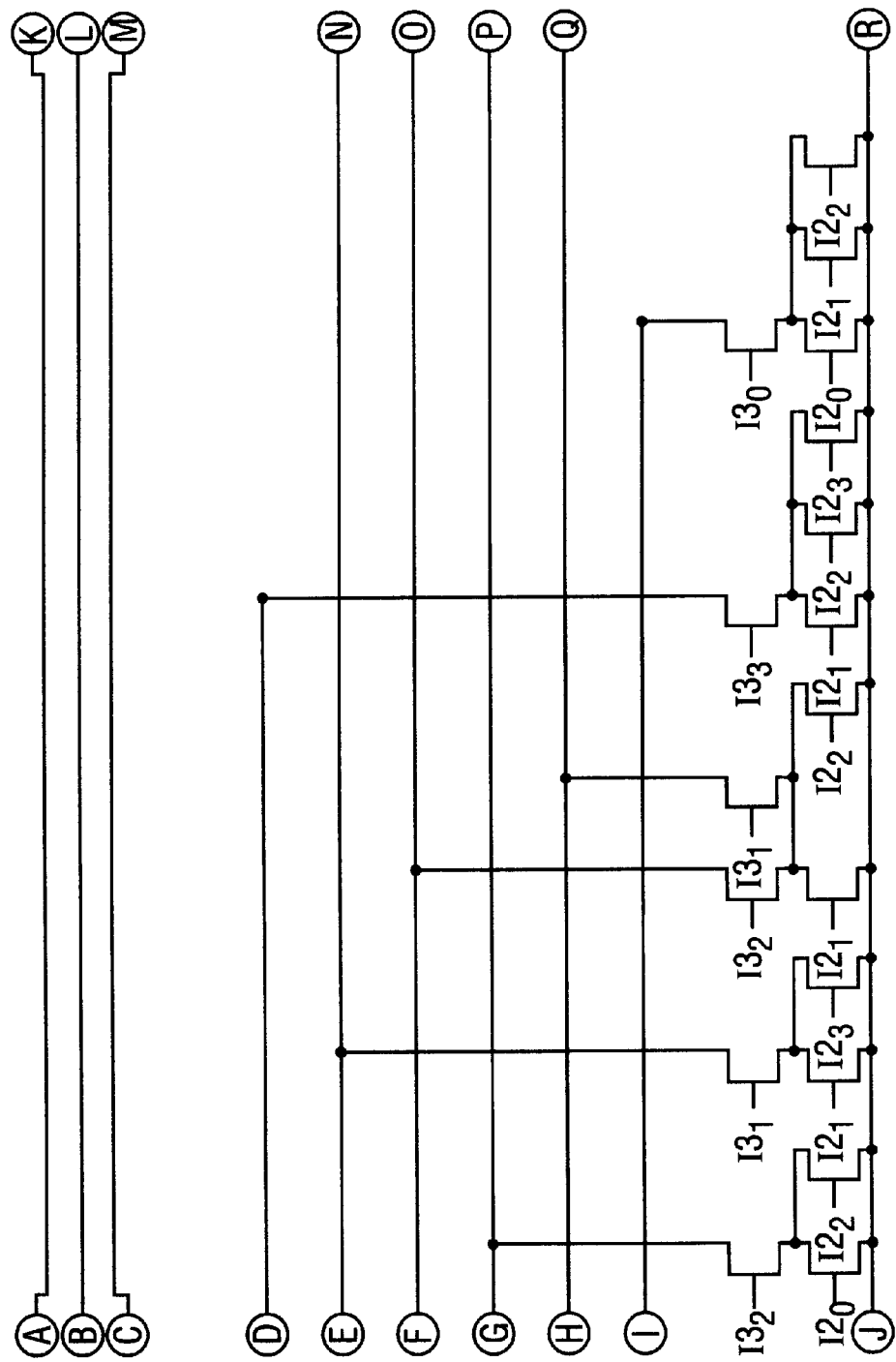
Figure 5C:
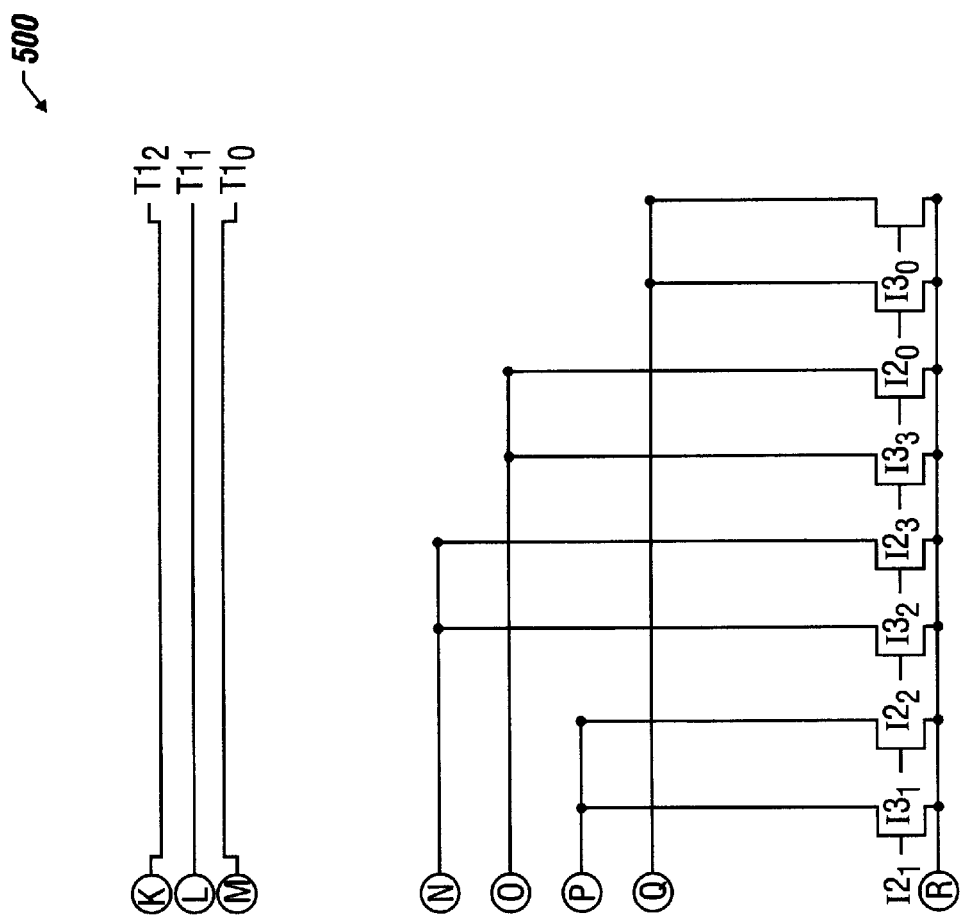

FIGS. 5A, 5B, and 5C show a circuit layout of adder gate gb 500 of FIG. 1. The input 1-of-4 signal I2 (114) comprises the four wires $I2_0$, $I2_1$, $I2_2$, and $I2_3$, and which couple to the 24 transistors of gate gb 500 as shown in FIGS. 5A–5C. The in put 1-of-4 signal I3 comprises the four wires $I3_0$, $I3_1$, $I3_2$, and $I3_3$, and which couple to the 26 transistors as shown in FIGS. 5A–5C. And, the input 1-of-4 signal I4 comprises the four wires $I4_0$, $I4_1$, $I4_2$, and $I4_3$, and which couple to the 10 transistors as shown in FIGS. 5A–5C. In the N-NARY logic style, gate gb 500 comprises 3 internal precharge devices that couple to the clock signal CLOCK, and a single evaluate device that also couples to the clock signal CLOCK. The output of gate gb 500 is the intermediate addend term T1, which is a 1-of-3 signal that comprises the wires $T1_0$, $T_1$, and $T1_2$ that couple to the internal evaluate nodes of gate gb 500. The output of gate gb 500 indicates the upper DIT of the sum of the three DITs. When the sum is 0, 1, 2 or 3, the upper DIT is zero, when it is 4, 5, 6 or 7 the upper DIT is 1, and when it is 8 or 9 the upper DIT is 2. While this gate's evaluate stack comprises 60 transistors, it has very good capacitance isolation. There are very few nodes that gate charge onto the discharge path of the evaluating node, and all such paths are "downwards", i.e., towards the evaluate device. This means that the gate, in spite of its high transistor count, will operate at a reasonable speed such as 150 ps in a typical 0.18 u CMOS process.

Figure 6A:
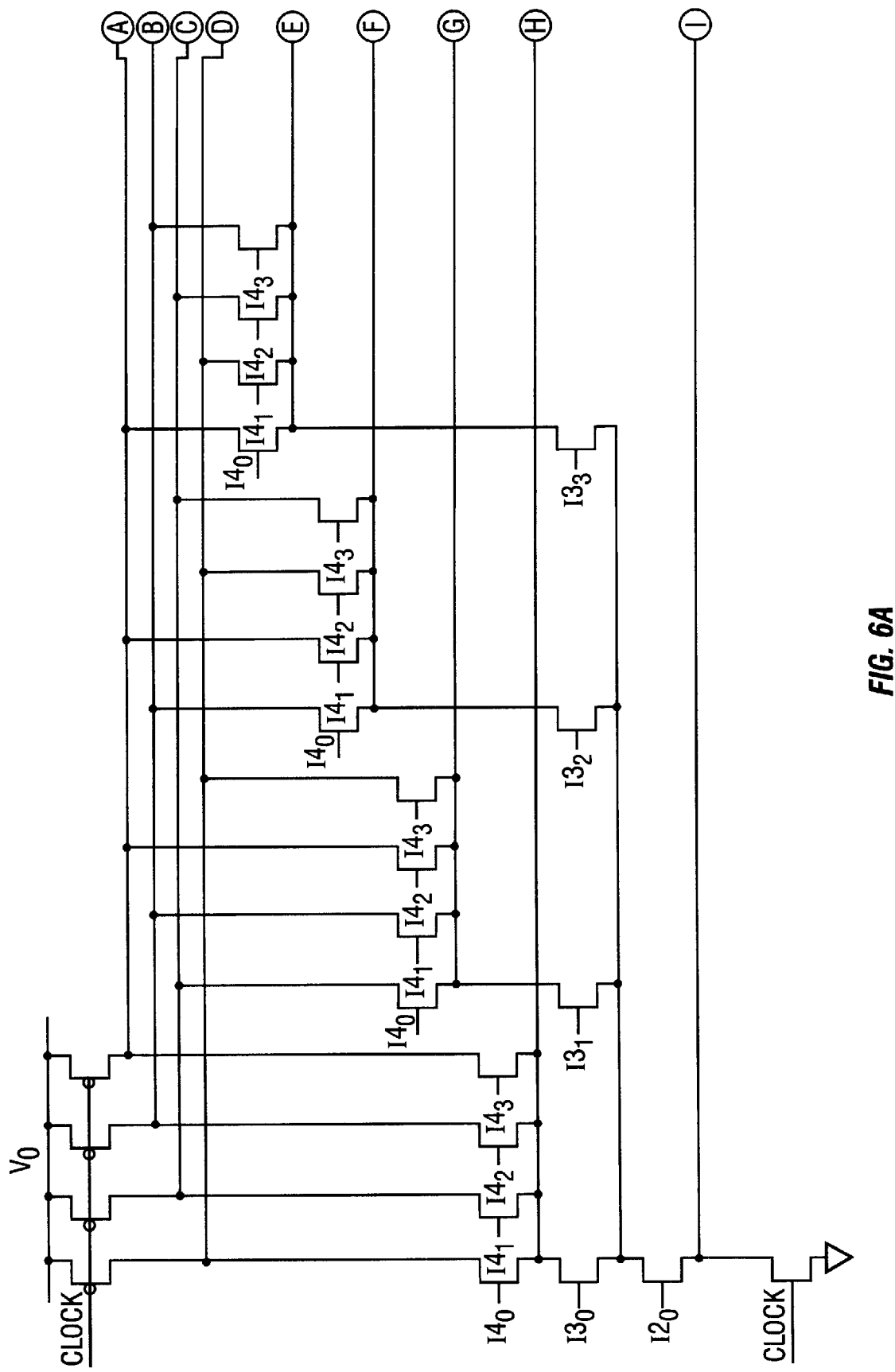
FIGS. 6A and 6B illustrate the circuit layout of the gc gate in the first level of the 5:2 CSA.
Figure 6B:
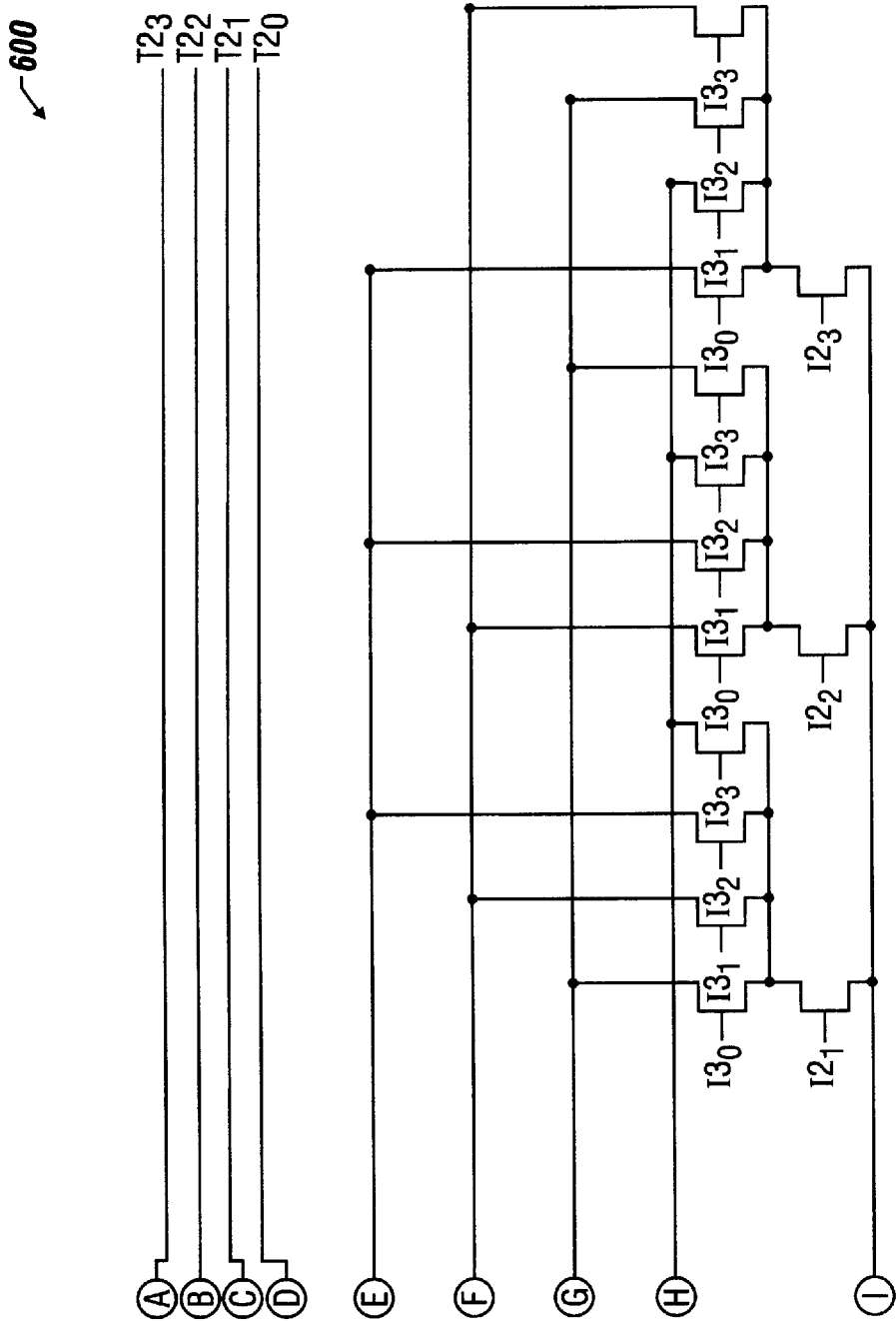

FIGS. 6A and 6B show a circuit layout of adder gate gc 600 of FIG. 1. Gate gc 600 couples to the same input signals I2, I3, and I4 as does gate gb 500, but generates the lower DIT of the result of adding the three signals as a 1-of-4 signal 610 used by both gate c 700 and gate s 800. The input 1-of-4 signal I2 (114) comprises the four wires $I2_0$, $I2_1$, $I2_2$, and $I2_3$, which couple to the 4 transistors of gate gc 600 as shown in FIGS. 6A and 6B. The input 1-of-4 signal I3 comprises the four wires $I3_0$, $I3_1$, $I3_2$, and $I3_3$, which couple to the 16 transistors as shown in FIGS. 6A and 6B. And, the input 1-of-4 signal I4 comprises the four wires $I4_0$, $I4_1$, $I4_2$, and $I4_3$, which couple to the 16 transistors as shown in FIG. 6A. In the N-NARY logic style, gate gc 600 comprises 4 internal precharge devices that couple to the clock signal CLOCK, and a single evaluate device that also couples to the clock signal CLOCK. The output of gate gc 600 is the intermediate addend term T2, which is a 1-of-4 signal that comprises the wires $T2_0$, $T2_1$, $T2_2$, and $T2_3$ that couple to the internal evaluate nodes of gate gc 600. This gate has perfect capacitance isolation, and operates in as little as 140 ps in a typical 0.18 u CMOS process. When the full sum is 0, 4 or 8, gate gc 600 outputs 0. When the full sum is 1, 5, or 9, this gate outputs 1. When the full sum is 2 or 6, this gate outputs 2, and when the full sum is 3 or 7, this gate outputs 3.

Figure 7A:
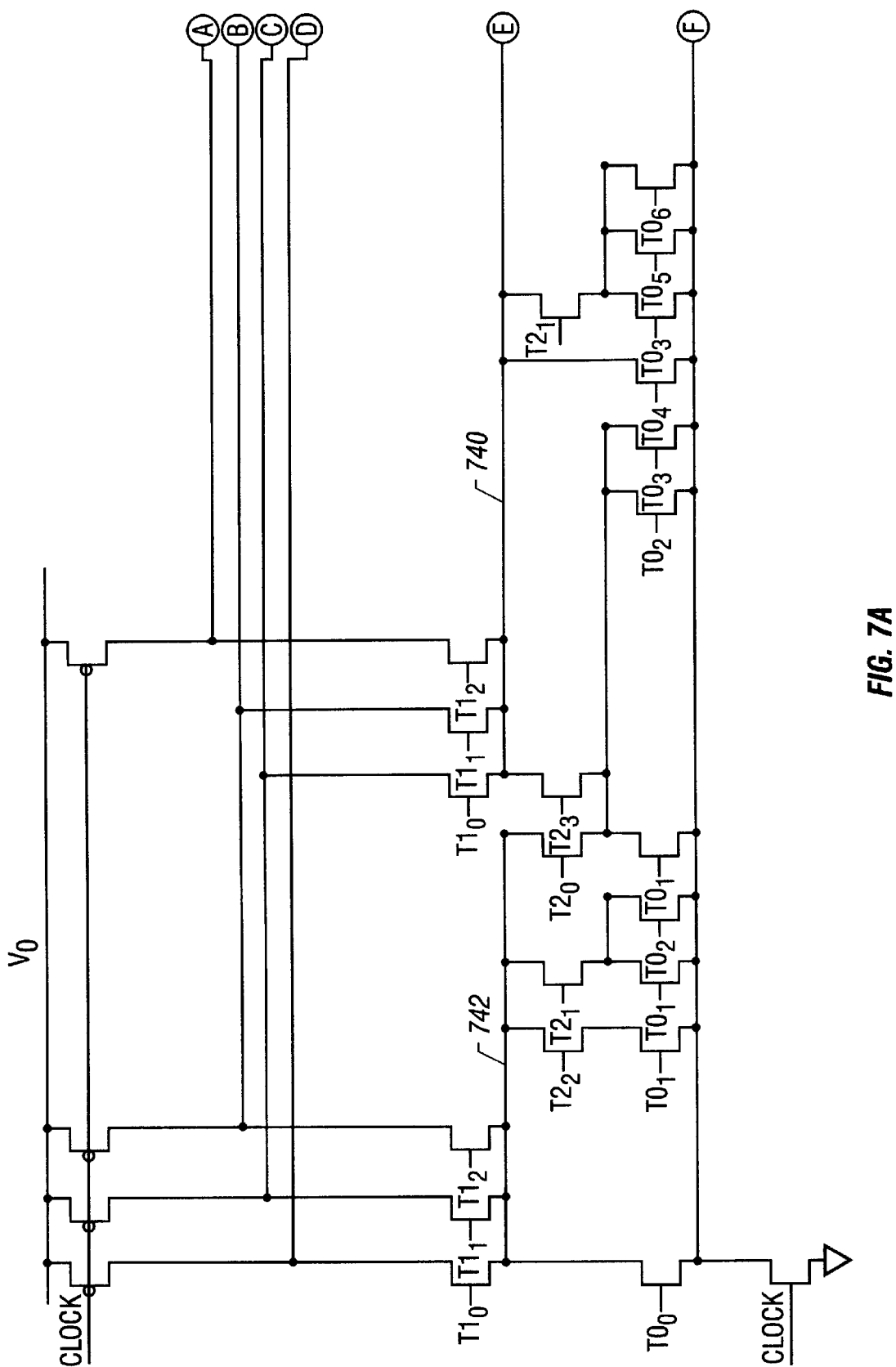
FIGS. 7A and 7B illustrate the circuit layout of the carry logic circuit in the second level of the 5:2 CSA.
Figure 7B:
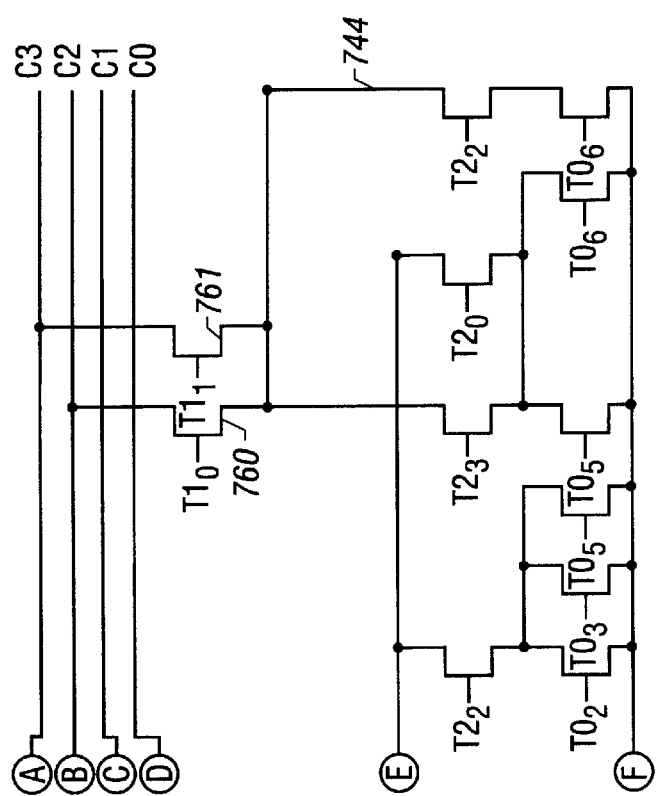

FIGS. 7A and 7B show a circuit layout of the carry logic circuit gate c 700. Gate c 700 couples to the outputs of all three first-level gates: gate ga 400, gate gb 500 and gate gc 600. Gate c 700 receives as inputs the intermediate addend terms T0, T1, and T2, and generates the output signal CARRY. The input 1-of-7 signal T0 comprises the seven wires $T0_0$, $T0_1$, $T0_2$, $T0_3$, $T0_4$, $T0_5$, and $T0_6$, which couple to the transistors of gate c 700 as shown in FIGS. 7A and 7B. The input 1-of-3 signal T1 comprises the three wires $T1_0$, $T1_1$, and $T1_2$, which couple to the transistors as shown in FIGS. 7A and 7B. And, the input 1-of-4 signal T2 comprises the four wires $T2_0$, $T2_1$, $T2_2$, and $T2_3$, which couple to the transistors as shown in FIGS. 7A and 7B. In the N-NARY logic style, gate c 700 comprises 4 internal precharge devices that couple to the clock signal CLOCK, and a single evaluate device that also couples to the clock signal CLOCK. The output of gate c 700 is the carry output CARRY, which is a 1-of-4 signal that comprises the wires $C_0$, $C_1$, $C_2$, and $C_3$ that couple to the internal evaluate nodes of gate c.

Gate gc 600 computes and produces the lower DIT from adding the inputs I2, I3 and I4, which on first examination should not be necessary for the production of the upper DIT of the result or CARRY 192. However, it is possible that the sum of the lower DIT from gate gc 600, added to the effective lower DIT of the 1-of-7 signal 410 (intermediate term T0) from gate ga 400 will produce a carry. This carry must be accounted for in order to generate a correct result, and results in a different arrangement of transistors than is found in typical N-NARY logic devices. This carry occurs, for example, when the intermediate term T0 (the 1-of-7 signal) equals three, and the intermediate term T2 (the 1-of-4 signal) equals 1. Referring now to FIGS. 7A and 7B, this situation would occur with the transistors coupled to $T0_3$ being gated on (or biased on) and transistors coupled to $T2_0$ were likewise being gated on. The discharge path must pass through internal node 740. Depending on the value of the intermediate term T1 from gate gb 500, the value of CARRY will have an output value of 1, 2 or 3. If instead, the intermediate term T2 from gate gc 600 equals 1, then the transistors coupled to $T2_1$ will not be asserted, but instead the transistors coupled to $T2_0$ will be asserted. Thus, internal node 742 must be part of the discharge path, and depending on the value of the intermediate term T1 from gate gb 500, the carry output CARRY will be 0, 1, or 2.

Additionally, if the intermediate term T2 equals 3, then we know that the intermediate term T1 cannot equal 2. This is because the maximum result of adding three DITs is the value 9, which in binary is 1001. If the lower DIT is 3, or a binary value of 11, then the upper DIT can be at most 1, or a binary value of 01. As a result of this restriction, node 744 of gate c 700 need only couple to the top-of-stack evaluate nodes through transistors coupled to the 1-of-3 signal 510 from gate gb 500 for the input values 0 and 1, which is illustrated by the two transistors 760 and 761.

Figure 8A:
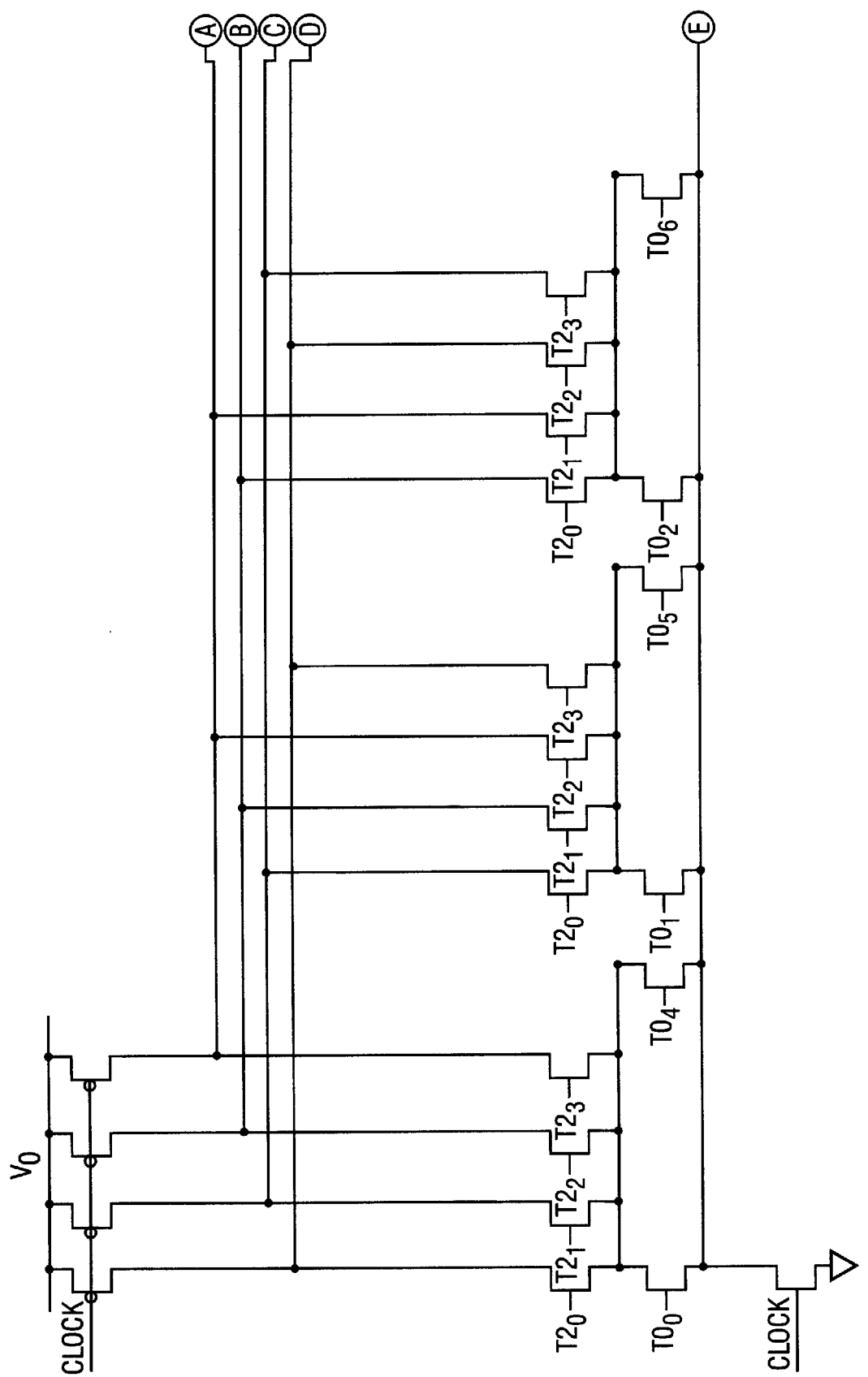
FIGS. 8A ad 8B illustrate the circuit layout of the sum adder in the second level of the 5:2 CSA.
Figure 8B:
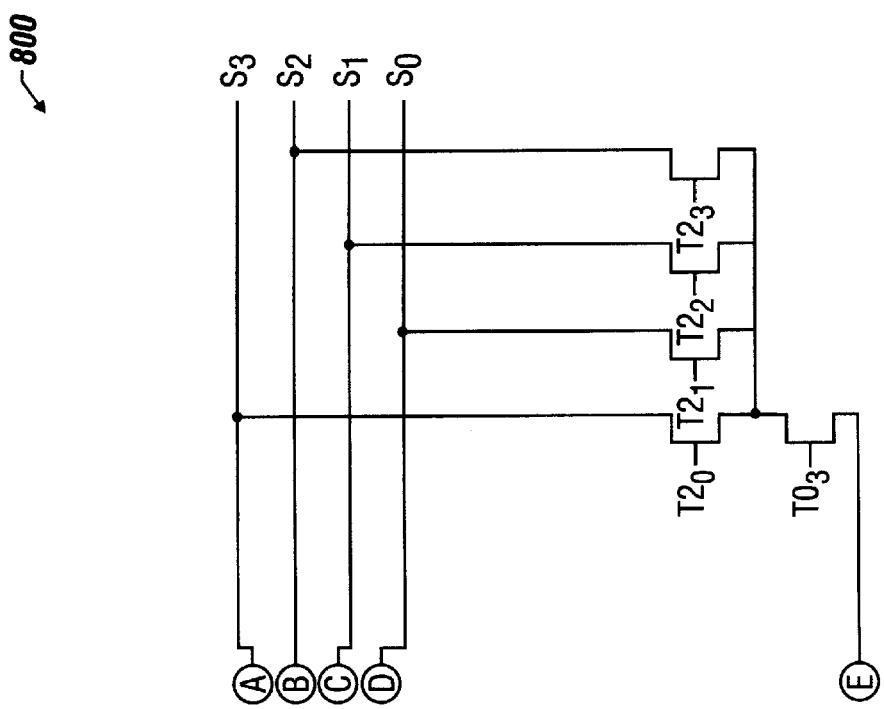

FIGS. 8A and 8B show a circuit layout of the sum adder gate s 800. Gate s 800 couples to the first level gates: gate ga 400 and gate gc 600. Gate s 800 receives as inputs the intermediate addend terms T0 and T2, and generates the output signal SUM. This is an ordinary SUM gate used in N-NARY adders (e.g., the various types of adders found in the previously discussed N-NARY adder patents). Additionally, this gate is very similar to gate ga 400, however, this gate 800 discards the carry. Therefore, any result greater than a value of 3 has a value of 4 subtracted from it. In other words, for this gate, 3+3 equals 2. This gate has perfect capacitance isolation, and operates with similar speeds to gate ga 400. Referring back to FIGS. 8A and 8B, the input 1-of-7 signal T0 comprises the seven wires $T0_0$, $T0_1$, $T0_2$, $T0_3$, $T0_4$, $T0_5$, and $T0_6$, which couple to the transistors of gate s 700 as shown. And, the input 1-of-4 signal T2 comprises the four wires $T2_0$, T2, $T2_2$, and $T2_3$, which couple to the transistors as shown in FIGS. 8A and 8B. In the N-NARY logic style, gate s 800 comprises 4 internal precharge devices that couple to the clock signal CLOCK, and a single evaluate device that also couples to the clock signal CLOCK. The output of gate s 800 is the sum output SUM, which is a 1-of-4 signal that comprises the wires $S_0$, $S_1$, $S_2$, and $S_3$ that couple to the internal evaluate nodes of gate s.

In summary, the present invention comprises an apparatus and method for a 5:2 carry save adder (CSA). The 5:2 CSA receives the five input signals I0, I1, I2, I3, and I4 and computes the two output signals SUM and CARRY. The 5:2 CSA comprises a first level of logic circuitry and a second level of logic circuitry. The first level of logic circuitry receives the input signals and generates three intermediate terms T0, T1, and T2. The second level of logic circuitry couples to the first level of logic circuitry and uses the intermediate terms to compute the two output signals SUM and CARRY. The 5:2 CSA of the present invention operates using either binary signals or N-NARY signals.

The first level of logic circuitry of the present invention further comprises a plurality of adders. A first adder adds the input signals I0 and I1 to generate a first intermediate term T0. A second adder adds the input signals I2, I3, and I4 to generate a second intermediate term T1. And, a third adder adds the input signals I2, I3, and I4 to generate a third intermediate term T2.

The second level of logic circuitry of the present invention further comprises a carry logic circuit and a sum adder circuit. The carry logic circuit receives intermediate terms from the plurality of adders in the first level of logic circuitry and computes an output carry signal CARRY. The sum adder receives intermediate terms from the first and third adders of the first level of logic circuitry and computes an output sum signal SUM.

Other embodiments of the invention will be apparent to those skilled in the art after considering this specification or practicing the disclosed invention. The specification and examples above are exemplary only, with the true scope of the invention being indicated by the following claims.

We claim the following invention:

1. A 5:2 carry-save-adder (CSA), comprising:
   five input 1-of-N signals, where N is greater than 2, that comprise I0, I1, I2, I3, and I4;
   a first level of logic circuitry that receives said input 1-of-N signals and generates intermediate terms; and
   a second level of logic circuitry that couples to said first level of logic circuitry and uses said intermediate terms to generate two 1-of-N output signals SUM and CARRY.

2. The 5:2 CSA of claim 1 wherein said first level of logic circuitry further comprises:
   a first adder that adds I0 and I1 to generate a first intermediate sum term;
   a second adder that adds I2, I3, and I4 to generate a second intermediate sum term; and
   a third adder that adds I2, I3, and I4 to generate a third intermediate sum term.

3. The 5:2 CSA of claim 1 wherein said second level of logic circuitry further comprises:
   a carry logic circuit that generates an output 1-of-N carry signal CARRY, where N is greater than 2; and
   a sum adder that generates an output 1-of-N sum signal SUM, where N is greater than 2.

4. A system that uses a 5:2 carry save adder (CSA), comprising:
   five input 1-of-N signals, where N is greater than 2, that comprise I0, I1, I2, I3, and I4;
   a first level of logic circuitry that receives said input 1-of-N signals and generates intermediate terms; and
   a second level of logic circuitry that couples to said first level of logic circuitry and uses said intermediate terms to generate two 1-of-N output signals SUM and CARRY.

5. The system of claim 4 wherein said first level of logic circuitry further comprises:
   a first adder that adds I0 and I1 to generate a first intermediate sum term;
   a second adder that adds I2, I3, and I4 to generate a second intermediate sum term; and
   a third adder that adds I2, I3, and I4 to generate a third intermediate sum term.

6. The system of claim 4 wherein said second level of logic circuitry further comprises:

a carry logic circuit that generates an output 1-of-N carry signal CARRY, where N is greater than 2; and a sum adder that generates an output 1-of-N sum signal SUM, where N is greater than 2.

7. A method that provides a 5:2 carry save adder (CSA), comprising:

providing five input 1-of-N signals, where N is greater than 2, that comprise I0, I1, I2, I3, and I4;

providing a first level of logic circuitry that receives said input 1-of-N signals and generates intermediate terms; and coupling a second level of logic circuitry to said first level of logic circuitry, said second level of logic circuitry uses said intermediate terms to generate two output 1-of-N signals SUM and CARRY.

8. The method of claim 7 wherein said first level of logic circuitry further comprises:

a first adder that adds I0 and I1 to generate a first intermediate sum term;

a second adder that adds I2, I3, and I4 to generate a second intermediate sum term; and a third adder that adds I2, I3, and I4 to generate a third intermediate sum term.

9. The method of claim 7 wherein said second level of logic circuitry further comprises:

a carry logic circuit that generates an output 1-of-N carry signal CARRY, where N is greater than 2; and a sum adder that generates an output 1-of-N sum signal SUM, where N is greater than 2.

10. A method that uses a 5:2 carry save adder (CSA), comprising:

receiving five 1-of-N input signals, where N is greater than 2, that comprise I0, I1, I2, I3, and I4;

generating intermediate terms using a first level of logic circuitry; and generating two output 1-of-N signals SUM and CARRY using a second level of logic circuitry.

11. The method of claim 10 wherein said first level of logic circuitry further comprises:

a first adder that adds I0 and I1 to generate a first intermediate sum term;

a second adder that adds I2, I3, and I4 to generate a second intermediate sum term; and a third adder that adds I2, I3, and I4 to generate a third intermediate sum term.

12. The method of claim 10 wherein said second level of logic circuitry further comprises:

a carry logic circuit that generates an output 1-of-N carry signal CARRY, where N is greater than 2; and a sum adder that generates an output 1-of-N sum signal SUM, where N is greater than 2.

* * * * *